United States Patent
Haug et al.

(10) Patent No.: US 11,159,047 B2
(45) Date of Patent: Oct. 26, 2021

(54) THERMALLY OPTIMIZED RX WIRELESS CHARGER FOR SMALL RX DEVICES

(71) Applicant: Apple Inc., Cupertino, CA (US)

(72) Inventors: Grant S. Haug, Mountain View, CA (US); Christopher S. Graham, San Francisco, CA (US); Aaron A. Oro, Palo Alto, CA (US); Eric S. Jol, San Jose, CA (US); Karl Ruben F. Larsson, Los Altos, CA (US); Timothy J. Rasmussen, San Jose, CA (US); Paul J. Thompson, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 114 days.

(21) Appl. No.: 16/554,349

(22) Filed: Aug. 28, 2019

(65) Prior Publication Data

US 2021/0036557 A1 Feb. 4, 2021

Related U.S. Application Data

(60) Provisional application No. 62/882,241, filed on Aug. 2, 2019.

(51) Int. Cl.
*H02J 50/00* (2016.01)
*H02J 50/70* (2016.01)
*H02J 50/10* (2016.01)
*H01F 27/36* (2006.01)

(52) U.S. Cl.
CPC ............ *H02J 50/005* (2020.01); *H02J 50/10* (2016.02); *H02J 50/70* (2016.02); *H01F 27/36* (2013.01)

(58) Field of Classification Search
CPC .. H01F 38/14; B50L 53/12–126; B50L 53/34; B50L 53/38–39
See application file for complete search history.

(56) References Cited

U.S. PATENT DOCUMENTS

| 2001/0002787 | A1* | 6/2001 | Hyogo | ................... | B60L 53/12 320/108 |
| 2010/0127660 | A1* | 5/2010 | Cook | ..................... | H02J 7/025 320/108 |
| 2011/0050164 | A1* | 3/2011 | Partovi | .............. | H02J 7/00034 320/108 |
| 2013/0105115 | A1* | 5/2013 | Kallmyer | ................. | H05K 7/20 165/76 |

(Continued)

OTHER PUBLICATIONS

"New England Wire Technologies Catalog", Jul. 15, 2006, New England Wire Technologies. (Year: 2006).*

(Continued)

*Primary Examiner* — Hal Kaplan
*Assistant Examiner* — David A Shiao
(74) *Attorney, Agent, or Firm* — Kilpatrick Townsend & Stockton LLP

(57) ABSTRACT

This application relates to a wireless charger with reduced heat generation during operation. The wireless charger includes a connector, a charging assembly and a cable connecting the connector and the charging assembly. A converter component has been moved away from the charging assembly, where an electronic device is placed for charging, to the connector. In some embodiments, one or more electromagnetic shielding components protect the components of the wireless charger.

19 Claims, 5 Drawing Sheets

(56) References Cited

U.S. PATENT DOCUMENTS

| | | | |
|---|---|---|---|
| 2014/0070763 A1* | 3/2014 | Chiles | H01F 38/14 |
| | | | 320/108 |
| 2014/0295703 A1* | 10/2014 | Nagashima | H01R 13/6582 |
| | | | 439/607.01 |
| 2015/0348697 A1 | 12/2015 | Graham et al. | |
| 2016/0351324 A1 | 12/2016 | Graham et al. | |
| 2017/0093198 A1* | 3/2017 | Graham | H02J 50/70 |
| 2017/0214269 A1* | 7/2017 | Howard | A61N 1/3787 |
| 2018/0026470 A1* | 1/2018 | Aghassian | H02J 7/025 |
| | | | 320/108 |
| 2020/0112207 A1* | 4/2020 | Piercey | H02J 50/80 |
| 2020/0251929 A1* | 8/2020 | Partovi | H02J 50/12 |

OTHER PUBLICATIONS

"Shielded Cable", Jun. 16, 2019, Wikipedia, <https://web.archive.org/web/20190616142326/https://en.wikipedia.org/wiki/Shielded_cable>. (Year: 2019).*

"Litz wire", Apr. 1, 2019, Wikipedia, <https://web.archive.org/web/20190401012916/https://en.wikipedia.org/wiki/Litz_wire>. (Year: 2019).*

* cited by examiner

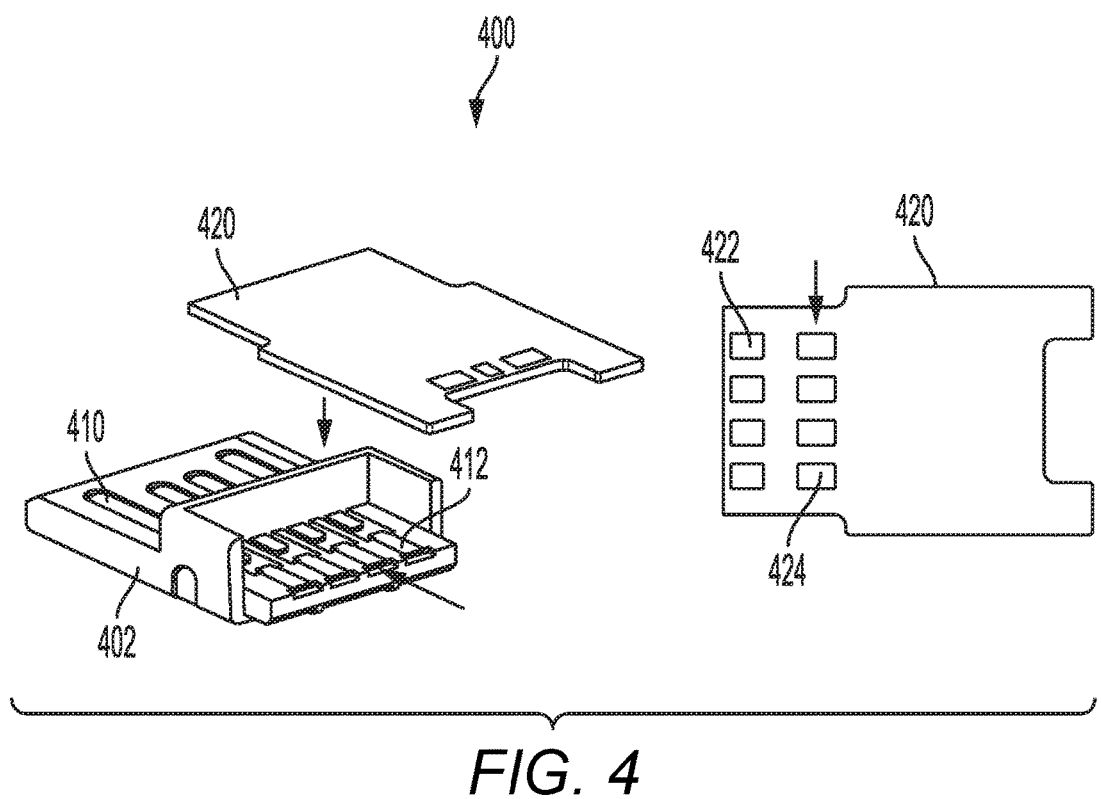
FIG. 4
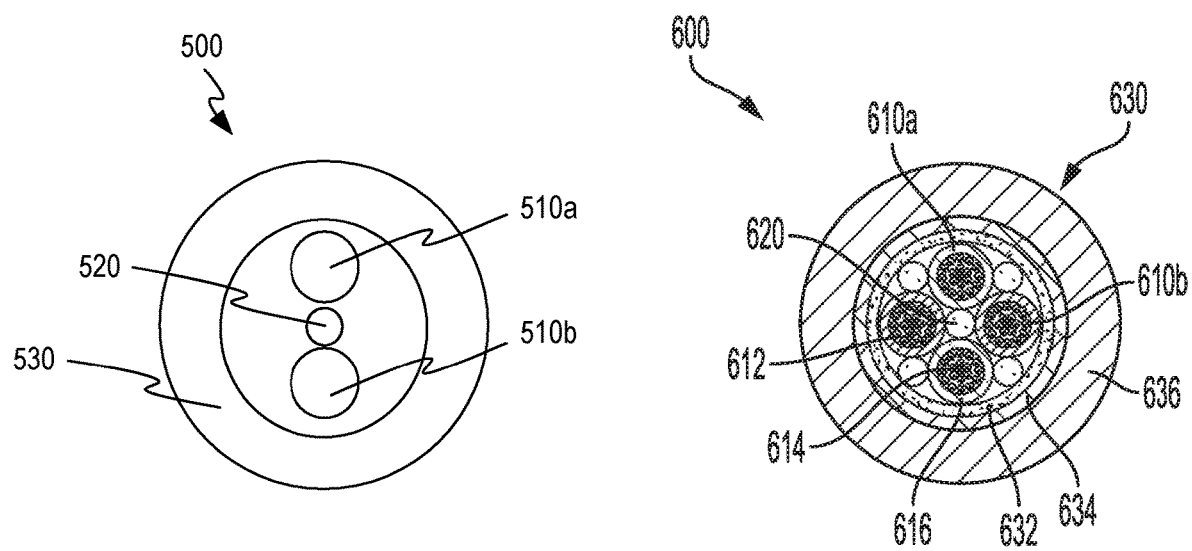
FIG. 5
FIG. 6

THERMALLY OPTIMIZED RX WIRELESS CHARGER FOR SMALL RX DEVICES

CROSS-REFERENCE TO RELATED APPLICATION

This application claims the benefit of and priority to U.S. Provisional Application No. 62/882,241, filed on Aug. 2, 2019, and titled "THERMAL MITIGATION FOR WIRELESS CHARGING DEVICES," the content of which is herein incorporated by reference in its entirety for all purposes.

FIELD

The described embodiments relate generally to inductive charging. More particularly, the present embodiments are directed towards inductive chargers with reduced heat generation during operation.

BACKGROUND OF THE INVENTION

Electronic devices, such as smart phones, tablet computers, laptop computers, smart watches, wearable devices, and the like can be powered by one or more internal batteries. Through use, the batteries can lose charge, requiring periodic recharging. Some electronic devices include circuitry that enables the batteries to be charged by connecting them to a power source via a physical cable. Other electronic devices include circuitry that enables the batteries to be recharged wirelessly, for example, by placing the electronic device on a wireless charger and inductively transferring power from a coil in the wireless charger to a coil in the electronic device.

During wireless charging, heat is typically generated. To avoid excessive heat generation and prevent the batteries from overheating, the current to the inductive coil can be decreased or temporarily stopped which can undesirably increase the charging time of the batteries.

BRIEF SUMMARY OF THE INVENTION

This disclosure describes various embodiments that relate to inductive chargers having improved thermal efficiency. In some embodiments one or more components that generate heat during a wireless charging operation are moved out of the housing of a wireless charger away from the electronic device being charged. For example, in some embodiments the DC-to-AC converter, which can be a source of heat during a charging operation, is disposed in a portion of the wireless charger that is separate and distinct from the housing in which the charging coil is disposed. Moving the DC-to-AC converter out of the housing and away from the electronic device can reduce the amount of heat that is transmitted to an electronic device being charged and thus enables a wireless charging operation to be maintained for longer durations and/or at higher power levels than may otherwise be possible. This in turn can reduce the charging time required to charge the electronic device. Additionally, moving the DC-to-AC converter and other associated electronic circuitry out the housing in which the charging coil is disposed enables the size of the housing to be reduced.

In some embodiments a wireless charger can include a connector, a wireless charging assembly and a cable extending between the charger and the wireless charging assembly. A DC-to-AC converter for converting a DC power signal to AC+ and AC− signals that can be used to wireless charge an electronic device can be disposed in a housing of the connector and thus be thermally isolated from the wireless charging assembly, which is coupled to the connector only by the cable. The AC+ and AC− signals can be transmitted from the connector to the charging assembly via wires in the cable. The cable can also include protective layers for protecting the wires from electromagnetic interference, heat, and damage. The charging assembly can include its own housing encasing a charging coil, an electromagnetic shield and a heatsink to further improve the thermal efficiency of the charger. The charging coil receives the AC+ and AC− signals and can generate a time-varying electromagnetic field to charge electronic devices placed on the charging assembly. In some examples, the electromagnetic shield can share a common ground with a protective layer in the cable and the electromagnetic surround in the connector, encasing the entire AC signal path from the connector to the charging assembly and reducing EMC radiated emissions.

A wireless charger is disclosed and includes the following: a connector comprising a plurality of electrical contacts and a DC-to-AC converter disposed within a connector housing, the DC-to-AC converter having an input coupled to at least one of the electrical contacts in the plurality of electrical contacts, and first and second outputs, the DC-to-AC configured to convert a DC power signal received at the input to AC+ and AC− signals on the first and second outputs, respectively; a charger assembly comprising a charger housing that defines an interior cavity and includes a charging surface, a charging coil disposed within the interior cavity in position spaced apart from the charging surface; and a cable coupled between the connector and the charger assembly, the cable comprising a first wire electrically coupled to the first converter output to transmit the AC+ to the charging coil and a second wire electrically coupled to the second converter output to transmit the AC− signal to the charging coil.

Another wireless charger is disclosed and includes the following: a connector, a charger assembly, and a cable coupled between the connector and the charger assembly; the connector comprising: plurality of contacts configured to receive a DC power signal; a DC-to-AC converter disposed within a connector housing and having a converter input and first and second converter outputs, the DC-to-AC converter coupled to receive the DC power signal at the converter input and generate AC+ and AC− signals on the first and second converter outputs, respectively; and an EMI shield disposed within the connector housing and encasing the DC-to-AC converter; the charger assembly comprising: a charger housing that defines an interior cavity and includes a charging surface; a charging coil disposed within the interior cavity in position spaced apart from the charging surface; an electromagnetic shield disposed within the interior cavity between charging surface and the charging coil; and a heatsink disposed within the interior cavity; and the cable comprising: first and second wires electrically coupled to first and second converter outputs, respectively, to transmit the AC+ and AC− signals to the charging coil; one or more tensile fibers extending along a length of the cable; a first insulation layer surrounding the first and second wires and the one or more tensile fibers; a braided conductive shield surrounding the first insulation layer; and an insulative jacket surrounding the braided conductive shield; wherein the EMI shield in the connector, the braided conductive shield in the cable and electromagnetic shield in the charger assembly are all coupled to a common ground.

A wireless charging device is disclosed and includes the following: a connector electrically coupleable with a power source, the connector comprising: contacts for electrically coupling with the power source and receiving direct current (DC) from the power source; and a converter attached to the contacts, the converter receiving the DC and converting the DC to positive alternating current (AC+) and negative alternating current (AC−); a cable electrically coupled with the connector and comprising a plurality of wires for transmitting the AC+ and the AC− from the converter, the plurality of wires including at least one wire for transmitting the AC+ and at least one wire for transmitting the AC−; a charging assembly electrically coupled with the cable for receiving the AC, the charging assembly comprising: a housing that defines an interior cavity and includes a charging surface for receiving an electronic device; a heat sink disposed within the interior cavity, the heat sink including first and second opposing faces with an opening extending from the first face to the second face through the heat sink, the first face adjacent to a bottom surface of the housing; a magnet disposed within the opening of the heat sink; an inductive coil disposed between the second face of the heat sink and the charging surface, the inductive coil electrically coupled with the cable and operable to receive the AC and wirelessly transmit power across the charging surface; and an electromagnetic shield disposed between the inductive coil and the charging surface, the electromagnetic shield comprising a tail extending from the electromagnetic shield to the bottom surface of the housing.

To better understand the nature and advantages of the present invention, reference should be made to the following description and the accompanying figures. It is to be understood, however, that each of the figures is provided for the purpose of illustration only and is not intended as a definition of the limits of the scope of the present invention. Also, as a general rule, and unless it is evident to the contrary from the description, where elements in different figures use identical reference numbers, the elements are generally either identical or at least similar in function or purpose.

BRIEF DESCRIPTION OF THE DRAWINGS

FIG. 4 is a simplified illustration of certain sub-components of a connector that can be incorporated into the wireless charger of FIG. 3 according to some embodiments of the present invention;

FIGS. 5 and 6 are simplified cross sections of cables that can be incorporated into the wireless charger of FIG. 3 according to some embodiments of the present invention;

DETAILED DESCRIPTION OF THE INVENTION

A wireless charger for an electronic device typically includes a charging coil positioned within a housing adjacent to a charging interface or surface and a variety of electronic components that supply power to the coil. Some of these components, such as a DC-to-AC converter that converts a direct current (DC) received by the wireless charger to a time varying alternating current (AC) that is delivered to the charging coil, can generate heat during the charging process. If the temperature of the wireless charger becomes sufficiently high within the housing near the charging interface or surface, it can raise the temperature of the electronic device being charged, which in turn, can cause the batteries in the electronic device to overheat. To avoid overheating the batteries, some wireless chargers can pulse or temporarily turn off power to the charging coil. However, this can increase the time it takes to charge the electronic device.

Some embodiments of the invention provide a solution to this problem by moving one or more components that generate heat out of the housing, away from the electronic device, to a different part of the charger assembly. For example, in some embodiments the DC-to-AC converter is disposed in a portion of the wireless charger that is separate and distinct from the housing in which the charging coil is disposed. Moving the DC-to-AC converter out of the housing and away from the electronic device reduces the amount of heat that is transmitted to an electronic device being charged and thus enables a wireless charging operation to be maintained for longer durations and/or at higher power levels than may otherwise be possible. This in turn can reduce the charging time required to charge the electronic device. Additionally, moving the DC-to-AC converter and other associated electronic circuitry out the housing in which the charging coil is disposed enables the size of the housing to be reduced.

These and other embodiments are discussed below with references to FIGS. 1-7; however, those skilled in the art will readily appreciate that the detailed description given herein with respect to these figures is for explanatory purposes only and should not be construed as limiting.

Figure 1:
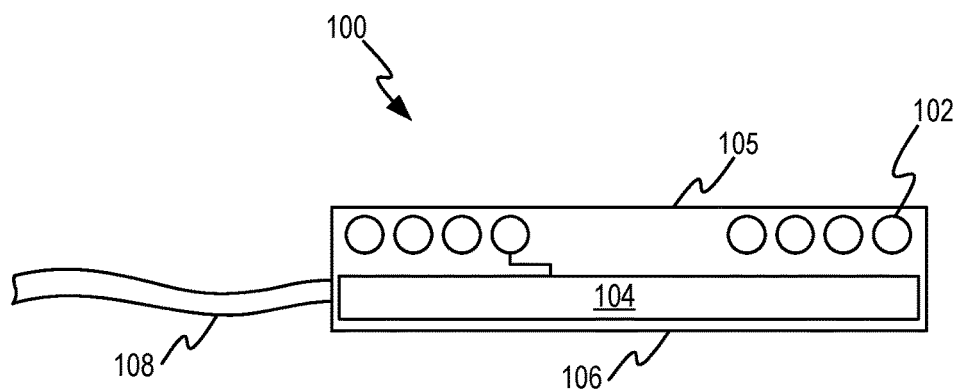
FIG. 1 is a simplified illustration of a previously known wireless charger.

FIG. 1 is a simplified illustration of a previously known wireless charging device 100. The wireless charging device 100 includes a charging coil 102 and electronic circuitry 104 disposed within a housing 106. Charging coil 102 is disposed adjacent to a charging surface 105 that can be a portion of an exterior surface of housing 106. Electronic circuitry 104 provides power to the charging coil and includes a DC-to-AC converter that converts a DC current received via a cable 108 from an external source (e.g., a USB connector, not shown, that provides a 5 volt DC current to the wireless charging device 100) to an AC current. The AC current can be supplied to charging coil 102, which generates a time-varying electromagnetic field across the charging surface that can induce a current within an inductive receiver coil in an electronic device positioned on or adjacent to charging surface 105. The electronic device can then use the induced current, for example, to recharge an internal battery.

When electronic circuitry 104 converts the DC current to an AC current, heat is generated that can raise the temperature within housing 106 of the wireless charging device 100. The increased temperature within the housing 106 of the wireless charging device 100 can cause the batteries in the electronic device to heat up and possibly overheat. To avoid overheating the batteries in the electronic device, electronic circuitry 104 can temporarily decrease or stop supplying AC current to the charging coil 102. However, decreasing or stopping the AC current flow can increase the time required to charge the electronic device.

Figure 2:
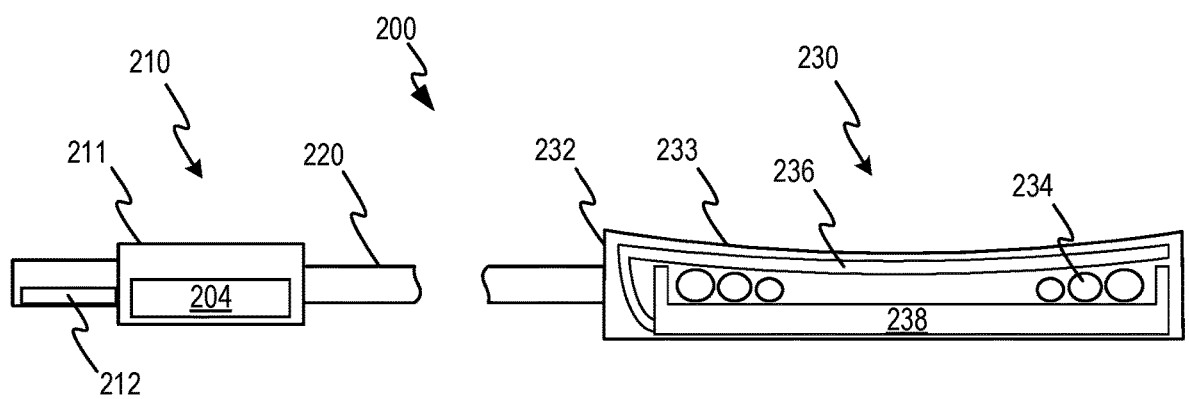
FIG. 2 is a simplified illustration of a wireless charger according to some embodiments of the present invention.

FIG. 2 is a simplified illustration of a wireless charging device 200 according to some embodiments of the present invention. The wireless charging device 200 includes a connector 210 for receiving and converting power form a power source, a charging assembly 230 for receiving the converted power and using it to wirelessly charge an electronic device and a cable 220 for transmitting the converted power from the connector 210 to the charging assembly 230. In contrast to wireless charging device 100 shown in FIG. 1, wireless charging device 200 does not include a DC-to-AC converter within the housing of charging assembly 230. Instead, the electronic circuitry 204 that converts a DC current to the AC current necessary to wirelessly charge an electronic device is disposed within a housing of connector 210. Since connector 210 is separated from charging assembly 230 and the two components are only coupled to each other by cable 220, heat generated by the DC-to-AC converter and its associated circuitry is not transmitted (or only minimally transmitted) to the charging assembly reducing heat local to the wireless charging assembly 230 and optimizing the thermal efficiency of wireless charging device 200 during wireless charging. Additionally, in some embodiments, the connector 210, the cable 220, and the charging assembly 230 are electrically coupled to share a common ground that encases the entire AC signal path from connector 210 to charging assembly 230, reducing EMC radiated emissions as discussed in detail below.

The connector 210 can be electrically coupled with a power source to receive electric current. In some embodiments, connector 210 can be a male plug connector that can be inserted into a corresponding female connector in an AC-to-DC adapter, such as an adapter that can be plugged into a standard AC wall outlet. For example, in some embodiments, connector 210 can be a type A or a type C Universal Serial Bus (USB) connector. The connector 210 can include a housing 211 that encases and protects various internal components of the connector 210. The connector 210 can receive a DC current from a power source via one or more electrical contacts 212. The contacts 212 can transmit the electric current from the power source to electronic circuitry 204 disposed within housing 211. Electronic circuitry 204 can include, among other components, a DC-to-AC converter that can receive a DC current from the power source and convert the DC current to an AC current that can be supplied to charging assembly 230 via cable 220. The contacts 212 can be arranged according to a standardized pinout (e.g., USB-A, USB-B, USB-C, etc.) that matches the pinout of the contacts in the power source. In some embodiments, the contacts 212 can include one or more contacts for receiving and/or transmitting data in addition to receiving power.

The DC-to-AC converter within electronic circuitry 204 can receive the DC electric current from the power source via the contacts 212 and convert it to an AC+ current and an AC− current. The DC-to-AC converter can be a variety of appropriate chips or circuitry that converts a DC signal to an AC signal. In various embodiments, and as non-limiting examples, the converter can be part of an ASIC, can be within a microcontroller or other microprocessor chip or can be made from various discrete components. In some embodiments, the electronic circuitry 204 can include a Main Logic Board (MLB) and/or a Printed Circuit Board Assembly (PCBA) that has a first set of bonding pads that can be electrically coupled to the contacts 212 and a second set of bonding pads that can be coupled to wires within cable 220. The DC-to-AC converter can be mounted to the MLB and electrical traces on the MLB can couple an input of the DC-to-AC converter to a bonding pad in the first set of bonding pads that is coupled to one of the contacts 212 that receives the DC current and can couple outputs of the converter to bonding pads in the second set of bonding pads on the MLB.

In some embodiments, the connector 210 can include a shield (not shown in FIG. 2) within housing 211 that encases the electronic circuitry 204 including the DC-to-AC converter. The shield can reduce or prevent EMI from reaching electronic circuitry 204. The shield can be grounded to a common ground for wireless charging device 200. As described further below, the shield can be connected with EMI shielding components in cable 220 and charging assembly 230 to form an EMI shield that encases the entire AC signal path and reduces or prevents AC signal loss.

The connector 210 can be electrically coupled with the cable 220 to transmit the AC signal from the connector. The cable 220 can include wires for transmitting the AC signal and/or data from the connector 210 to the charging assembly 230. The wires can be surrounded by a shield layer to reduce or prevent EMI from reaching the wires, and a protective layer providing protection against heat and damage. The shield layer can be connected with the common ground via an electrical connection with the shield. For ease of illustration the wires, shield layer and protective layer are not shown in FIG. 2 and are instead shown and discussed in more detail in conjunction with FIG. 5 below.

The cable 220 can be electrically coupled with the charging assembly 230 to transmit the AC signal to the charging assembly. In some embodiments, the charging assembly 230 is a circular puck shaped charger but the invention is not limited to any particular shape of charging assembly 230. The charging assembly 230 can have a housing 232 that encases the components of the charging assembly 230. The housing 232 can be made from metal, metal alloy, ceramic, plastic, composite, polycarbonate material, or any other suitable material. A charging surface 233 on the exterior of the housing 232 can receive an electronic device for charging. A charging coil 234 can be positioned inside the housing 232 at a location adjacent to the charging surface. The charging coil can be electrically coupled to the wires within cable 220, such that when an AC current is supplied to the charging coil 234 a time-varying electromagnetic field is generated across the charging surface. During a charging event, the time-varying electromagnetic field can induce a current within an inductive receiver coil in the electronic device being charged. The charging coil 234 can contain any suitable electrically conductive material (e.g., metals, alloys, semiconductors, conductive ceramics, conductive polymers).

An electromagnetic shield 236 can be positioned between the charging coil 234 and the charging surface 233. The electromagnetic shield 236 can be a capacitive shield that helps to remove coupled noise between the wireless charging device 200 and the electronic device during a charging operation. Electromagnetic shield 236 can drown out some or all of the capacitive coupling that can occur between the charging coil 234 and the receiver coil in the electronic device. In some embodiments, the electromagnetic shield 236 can include a tail for connecting with the common ground for wireless charging device 200 as described below. The electromagnetic shield 236 can connect to the common ground via shield layer 224. In some embodiments, electromagnetic shield 236 can be made of multiple thin layers, such as an electrically conductive layer, a dielectric layer and an adhesive layer there between.

A heat sink 238 can be included in the charger assembly to reduce the amount of heat emitted to the electronic device. The heat sink 238 can made entirely of or predominantly from a material having a high thermal conductivity (e.g., a metal) to draw the heat away from the electronic device. In some embodiments, the heat sink 238 can be positioned at or near a bottom surface of charging assembly 230 to act as a ballast that provides stability to the charging assembly anchoring it to a surface, such as a table or desk. Additionally or alternatively, the heat sink 238 can be coupled to the common ground of wireless charging device 200 and can provide EMI shielding as discussed herein.

Figure 3:
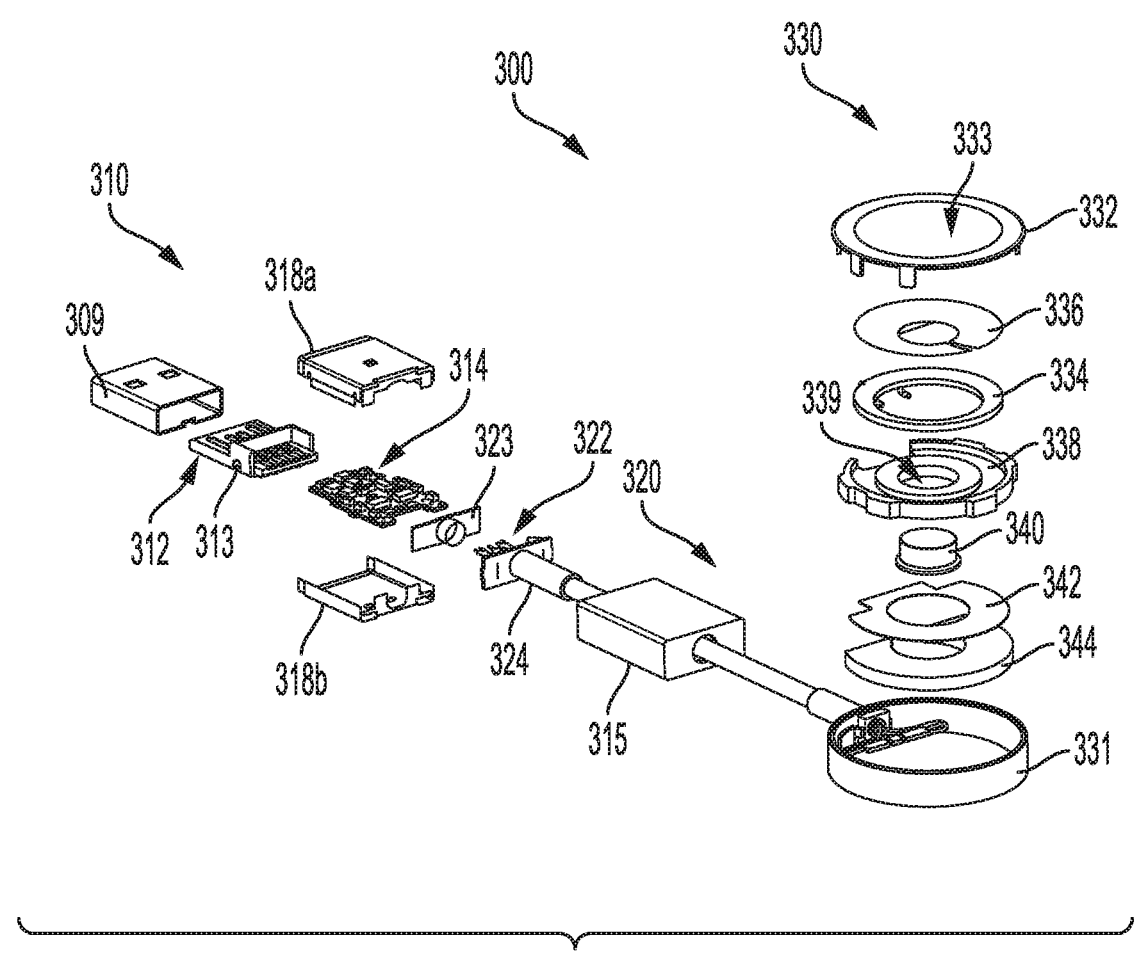
FIG. 3 is an illustration of an exploded view of a wireless charger including a connector, a cable, and a charging assembly according to some embodiments of the present invention.

FIG. 3 is an illustration of an exploded view of a wireless charger 300 including a connector 310, a cable 320, and a charging assembly 330 according to some embodiments of the present invention. Wireless charger 300 and its associated components can be representative of wireless charger 200 shown in FIG. 2.

The connector 310 can be a male connector that can be mated with a corresponding female connector of a power source or appropriate power adapter. In some embodiments, the connector 310 can correspond to a Universal Serial Bus (USB) connector, such as a Type A or a Type C USB connector. The connector 310 can include contacts 312 aligned to be electrically coupled with a power source when connector 310 is mated with an appropriate receptacle connector. The contacts 312 can be supported and held in place by contact tray 313. Contact tray 313 can be surrounded by contact housing 309 that defines an exterior shape of the portion of connector 310 that can be inserted into a corresponding female connector. As shown, the contacts 312 are in a four contact configuration, however, embodiments of the invention are not limited to a connector having four contacts and other embodiments can have few or more than four contacts.

The four contact configuration can include a contact for power, a contact for ground, and two contacts for data (e.g., for USB+ and USB− signals). The contacts 312 can receive electrical current from the power source and transmit it to electrical circuitry 314. The electrical circuitry 314 can include a DC-to-AC converter that converts a received DC current to an AC current that can be output as, for example, an AC+ current and an AC− current. The contacts 312 and electrical circuitry 314 can be electrically coupled to each other via one or more traces on an MLB or similar circuit board to which the circuitry is mounted. The contacts can be soldered to bonding pads on the MLB.

An electromagnetic shield 318 having an upper and lower portions 318a, 318b encases the electrical circuitry 314. The electromagnetic shield 318 can reduce or prevent electromagnetic interference from reaching the electrical circuitry including the DC-to-AC converter. The electromagnetic shield 318 can correspond to or comprise conductive or magnetic materials. In some embodiments, the electromagnetic shield 318 and contact housing 309 can be connected to a common ground for wireless charger 300. The electromagnetic shield 318 and contact housing 309 can be coupled together as part of a connector housing and can be included in a shielded pathway (i.e., a faraday cage) for the AC signal, reducing or preventing signal loss from EMI as described below.

A wire crimp 323 can hold wire bundles 322 in place. The wire crimp 323 can include a circular opening for receiving the wire bundles 322 that can then be deformed to hold the wire bundles 322 in place. In some embodiments, the wire crimp 323 can be connected to the common ground for the wireless charger 300 and included in the shielded pathway.

An outer shell or boot 315 can surround the electromagnetic shield 318 and wire crimp 323, providing additional structural support for the connector 310 as well as a pleasant cosmetic appearance. The outer boot 315 can have an open end for receiving a portion of the connector housing and a portion of the contact housing 309 can extend beyond the outer boot enabling the connector housing to be inserted into a corresponding female connector. Outer boot 315 can be fabricated from a plastic or polymer material and can be molded over the electrically conductive connector housing.

The cable 320 can be electrically coupled with the electrical circuitry 314 to transmit the electric current(s) (e.g., AC+ and AC− currents) from the connector 310 to the charging assembly 330. The cable 320 can include wire bundles 322 for transmitting the electric current surrounded by one or more protective layers 324 providing protection against electromagnetic interference, heat, and damage. One of the protective layers 324 can be connected to the common ground and shield the electric current(s) transmitted through wire bundles 322 from EMI as part of the shielded pathway as described below in conjunction with FIG. 5.

The charging assembly 330 can include a housing base 331 and a housing cap 332 forming a housing encasing the internal components of the charging assembly 330. The housing cap 332 includes a charging surface 333 for receiving an electronic device. A charging coil 334 can be positioned within the housing directly below the charging surface 333. Charging coil 3334 can be coupled to wire bundle 322 to receive an electric current(s) (e.g., AC+ and AC− currents) from the cable 320 to generate a time-varying electromagnetic field across the charging surface as described above. Housing cap 332 can be made from a material that allows the electromagnetic field generated by the charging coil to pass through charging surface 333. In some embodiments, the charging coil 334 can be optimized to include the greatest number of coils in an available space in the housing.

An electromagnetic shield 336 can be positioned between the housing cap 332 and a charging coil 334. The electromagnetic shield 336 can shield components in charging assembly 330 during a charging operation. The electromagnetic shield 336 can correspond to or comprise a suitable thin, flexible, material. In some embodiments, the electromagnetic shield 336 can comprise one or more layers including, for example, a dielectric layer, an adhesive layer, and a conductive layer. The electromagnetic shield 336 can include a tail that extends towards a bottom surface of the housing base 331. In some embodiments the tail of the electromagnetic shield 336 can connect the electromagnetic shield 336 to the common ground.

The charging assembly 330 can include a ferromagnetic sleeve 338 positioned such that the charging coil 334 is located between the ferromagnetic sleeve 338 and the charging surface 333. The ferromagnetic sleeve 338 can direct the electromagnetic flux lines from the charging coil 334 to the electronic device. The ferromagnetic sleeve 338 can include ferrite material (ceramic material composed of iron oxide) or any other suitable ferromagnetic material. The ferromagnetic sleeve 338 can correspond to a ferrite disk. In some embodiments, the ferromagnetic sleeve 338 can include areas where insulation has been applied. The insulation can prevent the ferromagnetic sleeve 338 from contacting and shorting the charging coil 334. The insulation can correspond to or comprise epoxy coating. The ferromagnetic sleeve 338 can include an opening 339 for receiving a magnet 340. The magnet 340 can aid in aligning the electronic device on the charging surface 333. The magnet 340 can extend from the housing base 331 through openings in the components of the charging assembly 330, with the top of the magnet 340 being adjacent to the charging surface 333.

A heat sink 344 can pull heat, generated by components in the charging assembly 330, away from the electronic device when it is on the charging surface 333. Additionally or alternatively, the heat sink 344 can be used as a ballast in the charging assembly 330 to add weight to the charging assembly 330 and prevent the charging assembly from being easily moved when the electronic device is set on the charging surface 333. In some embodiments, the heat sink 344 can be connected to the common ground via the ferromagnetic sleeve 338 and part of the shielded pathway.

FIG. 4 is a simplified illustration of certain sub-components of a connector 400 that can be incorporated into the wireless charger 300 of FIG. 3 according to some embodiments of the present invention. For example, connector 400 can be representative of some embodiments of connector 310. The connector 400 includes contacts 410 aligned to be electrically coupled with a power source when connector 400 is mated with an appropriate connector (e.g., a receptacle connector) associated with the power source. The contacts can be supported and held in place by contact support tray 402.

A circuit board 420 (shown in FIG. 4 in duplicate with both its upper and lower surfaces exposed) can be electrically coupled with the contacts via bonding pads 422. The circuit board 420 can include one or more traces extending between bonding pads 422 and electrical circuitry (not shown). The circuit board 420 can correspond to a PCBA or MLB.

In some embodiments, contacts 410 include one or more dummy contacts 412 that are not electrically connected to any particular signal or power source and are instead used to strengthen the connection between the contacts 410 and the circuit board 420. The dummy contacts 412 can correspond to dummy pads 424 on the circuit board 420. The dummy contacts 412 and the dummy pads 424 can be connected with solder and/or glue. an MLB or other circuit board to which the electrical circuitry is mounted to provide additional structural rigidity and support in the connection between circuit board 420 and the contacts within contact tray 402.

FIG. 5 is a simplified cross section of a cable 500 that can be incorporated into the wireless charger 300 of FIG. 3 according to some embodiments of the present invention and can be representative of cable 320 shown in FIG. 3. The cable 500 can include one or more wire bundles 510 for transmitting an AC current along the length of the cable 500. The AC current can be split into an AC+ and an AC− current and transmitted through multiple wire bundles 510 to reduce the interference between the currents, for example a wire 510a can transmit the AC− signal and wire 510b can transmit an AC+ signal. The wire bundles 510 can be optimized to transmit the AC current at a specific frequency with minimal losses.

A strengthening member 520 can be included in the cable 500 to increase resistance against stresses put on the cable. The strengthening member 520 can include one or more fibers (e.g., carbon fibers) for strengthening the cable 500 against stresses in a specific direction. For example, the fibers can be used to strengthen the cable 500 against tensile stresses put on the cable.

One or more protective layers 530 can surround the wires. The one or more protective layers 530 can provide protection against electromagnetic interference, heat, and damage. The protective layers 530 can include, for example, an insulating jacket and/or a conductive shield. In some embodiments, one or more of the protective layers 530 can be an electrically conductive layer that is electrically coupled between an EMF shield in a connector and an EMF shield in a charging assembly.

FIG. 6 is a simplified cross section of a cable 600 that can be incorporated into the wireless charger 300 of FIG. 3 according to some embodiments of the present invention and can be representative of cable 320 shown in FIG. 3. The AC− current can be transmitted through two wires 610a spaced apart from each other within the cable 600 and the AC+ current can be transmitted through two wires 610b within cable 600. The wire bundles 610 can be arranged in the cable to reduce interference between wire bundles by separating cables transmitting the same type of AC current. Multiple strengthening members 620 can be included in the cable 600, increasing resistance against stresses put on the cable. For example, strengthening member 620 can be at the center of the cable 600 encircled by additional four strengthening members, one between outer surfaces of each adjacent wire 610a, 610b pairing.

Each of the wires 610a, 610b can be a stranded wire that includes multiple strands 612 for transmitting the AC signal surrounding and a central fiber 614 for strengthening the wires. An electrically insulative sheath 616 can surround the wire strands of each wire 610a, 610b. The diameter of each wire strand 612 can be optimized to transmit the electric current at a specific frequency. For example, the diameter of each wire strand 612 can be optimized to transmit the electric current at a frequency of about 380 hertz. The wire strands can be made from copper, copper alloy, or other electrically conductive material. The central fiber 614 can provide resistance against stresses applied to the wires 610a, 610b. In some embodiments, the central fiber 614 can contain conductive material. The conductive material can transmit data along the length of the cable. As described further below, the conductive material can be used as a ground path for another component of the wireless charger 300. The conductive material can be a conductive foil surrounding the central fiber 614.

Cable 600 can include a multi-layer protective structure 630 that can include, for example, an inner insulating layer 632, a conductive shield layer 634, and an outer sheath layer 636. The inner insulating layer 632 can be made from an electrically insulative material and provide additional structure to cable 600 while also providing thermal and electrical insulation for the wires 610a, 610b. The conductive shield layer 634 can be connected to the common ground and reduce or prevent electromagnetic interference as part of the shielded pathway. The conductive shield layer 634 can protect the AC signal from signal losses caused by electromagnetic interference. In some embodiments, the conductive shield layer 634 is a braided conductive shield. The outer sheath layer 636 can be a polymer layer that provides protection from physical objects in the surrounding environment and provides additional strength.

Figure 7A:
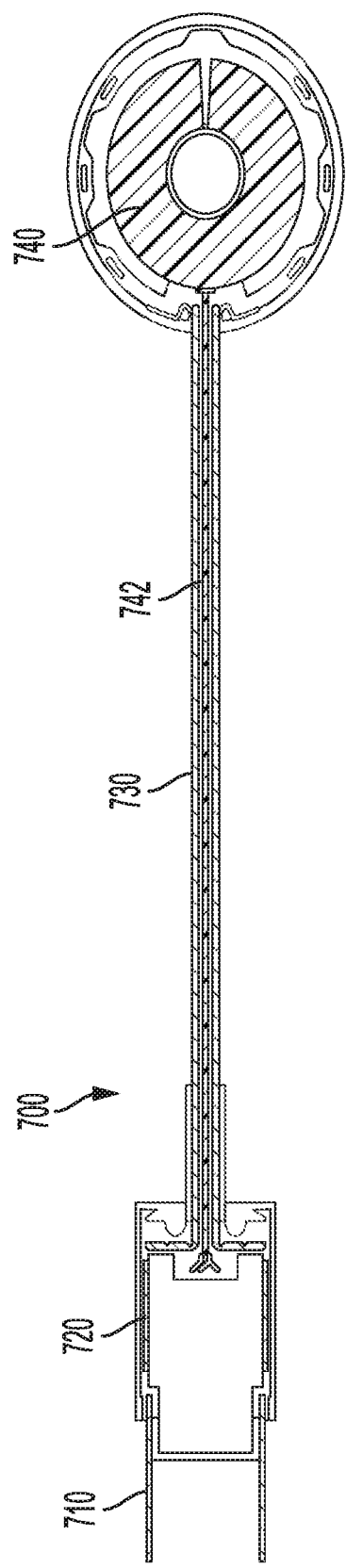
FIGS. 7A and 7B are simplified illustrations of shielded pathways that can be incorporated into the wireless charger of FIG. 3 according to some embodiments of the present invention.
Figure 7B:
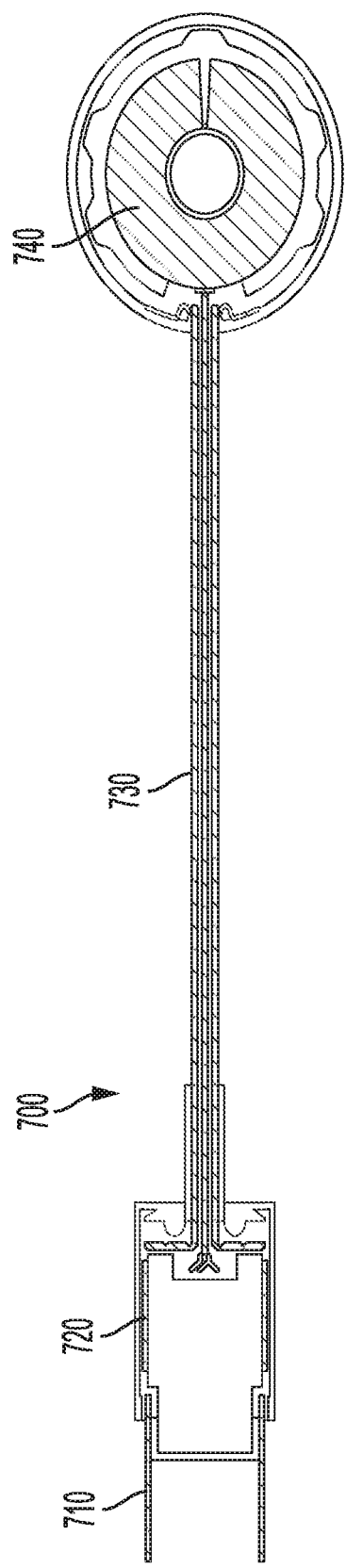

FIGS. 7A and 7B are simplified illustrations of shielded pathways that can be incorporated into the wireless charger 300 of FIG. 3 according to some embodiments of the present invention. Each of FIGS. 7A and 7B depict a connector and a wireless charging assembly coupled to each other by a cable. As shown in the two figures, in some embodiments of the invention the shielded pathway 700 can extend all the way from the connector housing to the wireless charging assembly including along the entirety of the cable that couples the connector to the wireless charging assembly. For example, the shielded pathway 700 can extend from a contact housing 710 and electromagnetic shield 720 through a conductive shield layer 730 that extends along an entire length of and surrounds one or more wires that carry the AC+ and AC− signals within the cable. The contact housing 710, electromagnetic shield 720, and conductive shield layer 730 can be electrically coupled to each other and connected to a common ground of the wireless charger 300. Shielded pathway 700 can prevent or reduce electromagnetic radiation from interfering with the AC signal. For example, shielded pathway 700 can act as a faraday cage surrounding the entirety of the AC signal path of the wireless charger to prevent or reduce interference from environmental electromagnetic interference. An electromagnetic shield 740 in the charging assembly 330 can be separately connected to the common ground via a separate grounding cable 742. The electromagnetic shield 740 can be a capacitive shield that helps to remove coupled noise between the wireless charging device 200 and the electronic device during a charging operation.

In other embodiments, such as shown in FIG. 7B, the electromagnetic shield 740 can be electrically connected with the common ground via conductive shield layer 730 in the cable. The electromagnetic shield 740 can be included in the shielded pathway 700. The AC signal path can be surrounded by the shielded pathway 700 from the contact housing 710 to the electromagnetic shield 740.

Figure 8:
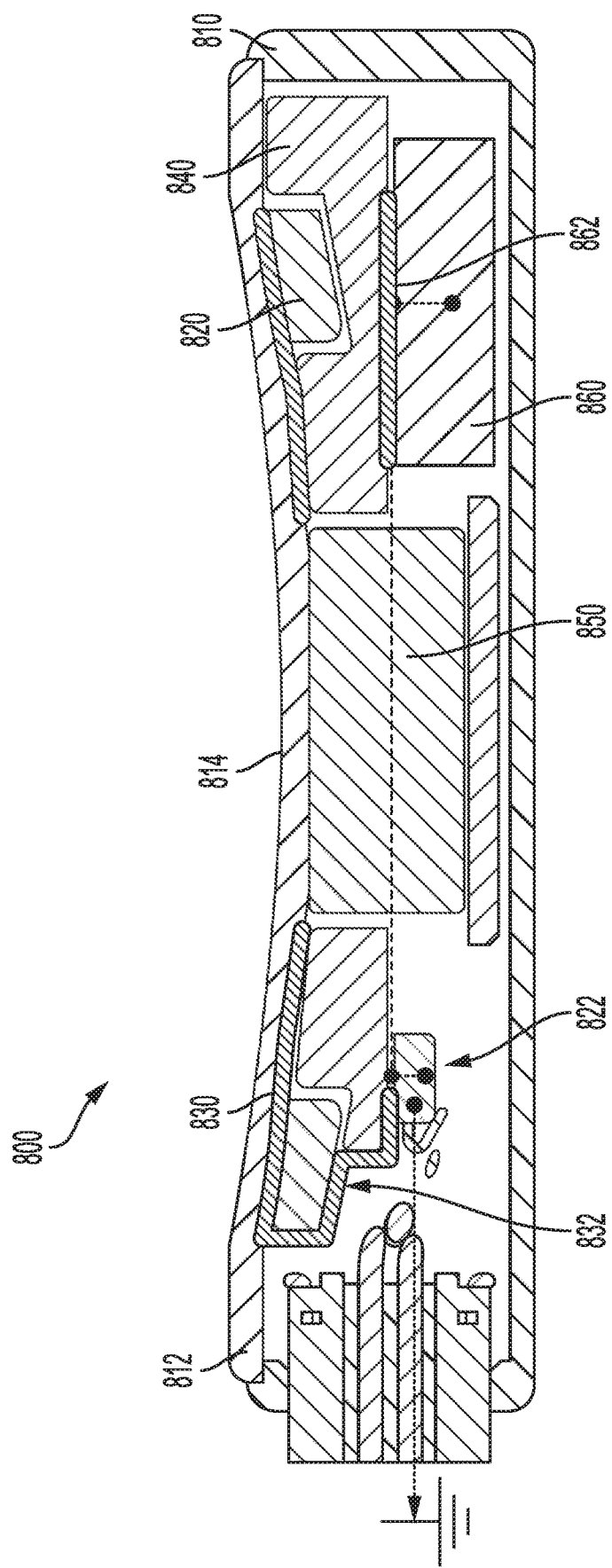
FIG. 8 is a simplified cross section of a charging assembly that can be incorporated into the wireless charger of FIG. 3 according to some embodiments of the present invention.

FIG. 8 is a simplified cross section of a charging assembly 800 according to some embodiments of the present invention that can be representative of charging assembly 330 shown in FIG. 3. The charging assembly 800 can include a housing that includes a bottom housing portion 810 coupled to a cap 812, which together define an interior cavity of the charging assembly. In some embodiments the bottom housing portion 810 and cap 812 are made from different materials. For example, in some embodiments housing portion 810 can be made from a metal while cap 812 can be made from a plastic or similar material that allows an electromagnetic field to pass through a charging surface 814 of the cap. A charging coil 820, an EMF shield 830, a ferromagnetic sleeve 840, a magnet 850, and a heat sink 860 can all be disposed within the interior cavity defined by housing portion 810 and cap 812.

As shown in FIG. 8, the EMF shield 830 can include a tail 832 extending from the EMF shield to a ground termination point 822. The ground termination point 822 can serve as an electrical connection point for the shield path described above. An adhesive layer 862 can be included between the ferromagnetic sleeve 840 and the heat sink 860. In some embodiments, the adhesive layer 862 can form an electrical connection between the ferromagnetic sleeve 840 and the heat sink 860 such that, the ferromagnetic sleeve 840 and the heat sink 860 are electrically connected to the ground termination point 822. The heat sink 860 can be connected to the common ground, reducing EMC radiated emissions as discussed above.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

What is claimed is:

1. A wireless charger comprising:
a connector comprising a plurality of electrical contacts and a DC-to-AC converter disposed within a connector housing, the DC-to-AC converter having an input coupled to at least one of the electrical contacts in the plurality of electrical contacts, and first and second outputs, the DC-to-AC converter configured to convert a DC power signal received at the input to an AC+ signal and an AC− signal on the first and second outputs, respectively;
a charger assembly comprising a charger housing that defines an interior cavity and includes a charging surface, a charging coil disposed within the interior cavity in a position spaced apart from the charging surface;
a cable coupled between the connector and the charger assembly, the cable comprising a first wire electrically coupled to the first output of the DC-to-AC converter to transmit the AC+ signal to the charging coil and a second wire electrically coupled to the second output of the DC-to-AC converter to transmit the AC− signal to the charging coil; and
a faraday cage comprising an EMI shield disposed within the connector housing and encasing the DC-to-AC converter, an electromagnetic shield disposed within the interior cavity of the charger assembly between the charging surface and the charging coil, and a braided conductive shield surrounding the first and second wires of the cable, the faraday cage forming a shielded pathway for the AC+ and AC− signals from the connector to the charger assembly and electrically coupling the connector, the charger, and the cable to a common ground.

2. The wireless charger of claim 1 wherein the faraday cage encloses an entirety of a signal path for the AC+ and AC− signals from the DC-to-AC converter to the charger assembly.

3. The wireless charger of claim 1 wherein the faraday cage further comprises a ferrite disk disposed within the interior cavity of the charger assembly and being electrically coupled to the common ground.

4. The wireless charger of claim 3 wherein the faraday cage further comprises a heat sink disposed within the interior cavity of the charger assembly and being electrically coupled to the common ground via the ferrite disk.

5. A wireless charger comprising:
a connector, a charger assembly, and a cable coupled between the connector and the charger assembly;
the connector comprising: a plurality of contacts configured to receive a DC power signal; a DC-to-AC converter disposed within a connector housing and having a converter input and first and second converter outputs, the DC-to-AC converter coupled to receive the DC power signal at the converter input and generate AC+ and AC− signals on the first and second converter outputs, respectively; and an EMI shield disposed within the connector housing and encasing the DC-to-AC converter;
the charger assembly comprising: a charger housing that defines an interior cavity and includes a charging surface; a charging coil disposed within the interior cavity in a position spaced apart from the charging surface; an electromagnetic shield disposed within the interior cavity between the charging surface and the charging coil; and a heat sink disposed within the interior cavity; and
the cable comprising: first and second wires electrically coupled to the first and second converter outputs, respectively, to transmit the AC+ and AC− signals to the charging coil; one or more tensile fibers extending along a length of the cable; a first insulation layer surrounding the first and second wires and the one or more tensile fibers; a braided conductive shield surrounding the first insulation layer; and an insulative jacket surrounding the braided conductive shield;
wherein the EMI shield in the connector, the braided conductive shield in the cable, and the electromagnetic shield in the charger assembly are electrically coupled to a common ground and form a faraday cage having a shielded pathway for the AC+ and AC− signals from the connector to the charger assembly.

6. The wireless charger of claim 5 further comprising:
third and fourth wires coupled to the first and second converter outputs, respectively, to transmit the AC+ and AC− signals to the charging coil, wherein the first and third wires are positioned on opposing sides of a central tensile fiber and the second and fourth wires are positioned on opposing sides of the central tensile fiber; and
a plurality of tensile fibers positioned circumferentially around the central tensile fiber between the first, second, third, and fourth wires and the first insulation layer.

7. The wireless charger of claim 6 wherein each of the first to fourth wires is a wire bundle and each wire bundle comprises:
a tensile fiber running the length of the wire bundle;
a plurality of wire strands circumferentially positioned around the tensile fiber, each wire strand running the length of the wire bundle; and
an insulation jacket surrounding the plurality of wire strands.

8. The wireless charger of claim 6 wherein each of the first to fourth wires is a wire bundle and each wire bundle comprises:
a data line running the length of the wire bundle;
a plurality of wires circumferentially positioned around the data line, each of the plurality of wires running the length of the wire bundle; and
an insulation jacket surrounding the plurality of wires.

9. The wireless charger of claim 5 wherein the electromagnetic shield of the charger assembly comprises a tail extending from an edge of the electromagnetic shield away from the charging surface, the tail electrically coupled with the braided conductive shield of the cable.

10. The wireless charger of claim 5 wherein the charger assembly further comprises a ferrite disk disposed between the charging coil and the heat sink, the ferrite disk comprising a channel for receiving the charging coil.

11. The wireless charger of claim 10 wherein the ferrite disk further comprises a central opening and the charger assembly further comprises an alignment magnet disposed within the central opening.

12. The wireless charger of claim 10 wherein the ferrite disk is coated with an insulative material that electrically isolates the ferrite disk from the charging coil and the ferrite disk is coupled to the common ground.

13. The wireless charger of claim 5 wherein the connector is a male plug connector and the connector housing comprises a first opening in which the plurality of contacts are disposed and a second opening through which the cable enters the connector.

14. The wireless charger of claim 13 wherein the connector further comprises a crimp comprising a circular protrusion that defines the second opening, the crimp electrically coupled to the braided conductive shield.

15. The wireless charger of claim 5 wherein the connector further comprises a circuit board having the DC-to-AC converter mounted thereon, the circuit board comprising:
a first plurality of bonding pads coupled to the plurality of contacts;
a second plurality of bonding pads coupled to the first and second wires; and
electrical traces coupled between the first and second pluralities of bonding pads and the DC-to-AC converter.

16. The wireless charger of claim 5 wherein the charging coil further comprises a flattened end adjacent to an opening of the charger housing.

17. The wireless charger of claim 5 wherein the heat sink is positioned adjacent to a bottom surface of the charger assembly and serves as ballast.

18. A wireless charging device, the wireless charging device comprising:
a connector electrically coupleable with a power source, the connector comprising: contacts for electrically coupling with the power source and receiving a direct current (DC) signal from the power source; and a converter attached to the contacts, the converter receiving the DC signal and converting the DC signal to a positive alternating current (AC+) signal and a negative alternating current (AC−) signal;
a cable electrically coupled with the connector and comprising a plurality of wires for transmitting the AC+ signal and the AC− signal from the converter, the plurality of wires including at least one wire for transmitting the AC+ signal and at least one wire for transmitting the AC− signal;
a charging assembly electrically coupled with the cable for receiving the AC+ and the AC− signals, the charging assembly comprising: a housing that defines an interior cavity and includes a charging surface for receiving an electronic device; a heat sink disposed within the interior cavity, the heat sink including first and second opposing faces with an opening extending from the first face to the second face through the heat sink, the first face adjacent to a bottom surface of the housing; a magnet disposed within the opening of the heat sink; an inductive coil disposed between the second face of the heat sink and the charging surface, the inductive coil electrically coupled with the cable and operable to receive the AC+ and AC− signals and wirelessly transmit power across the charging surface; and an electromagnetic shield disposed between the inductive coil and the charging surface, the electromagnetic shield comprising a tail extending from the electromagnetic shield to the bottom surface of the housing; and a faraday cage comprising an EMI shield disposed within the connector and encasing the converter, the electromagnetic shield in the charging assembly, and a braided conductive shield surrounding the plurality of wires, the faraday cage forming a shielded pathway for the AC+ and AC− signals from the connector to the charging assembly and electrically coupling the connector, the charging assembly, and the cable to a common ground.

19. The wireless charging device of claim 18 wherein the cable further comprises a plurality of tensile fibers and wherein at least one of the tensile fibers is wrapped in a conductive material and the conductive material transmits data between the connector and the charging assembly.

* * * * *